United States Patent [19]

Ambrose

[11] 4,153,079
[45] May 8, 1979

[54] FLEXIBLE HOSE LINES

[75] Inventor: John Ambrose, Birmingham, England

[73] Assignee: Dunlop Limited, Great Britain

[21] Appl. No.: 568,316

[22] Filed: Apr. 15, 1975

[30] Foreign Application Priority Data

Apr. 19, 1974 [GB] United Kingdom ............... 17370/74

[51] Int. Cl.² ............................................. F16L 55/00
[52] U.S. Cl. ................................................ 138/104;
138/30; 138/103; 138/137; 138/124; 138/178;
116/210
[58] Field of Search .......................... 138/36, 26–28,
138/103, 30, 104, 109, 137, 121, 122, 124, 126,
148, 177, 178; 285/93, 149; 73/40.5 R, 49.1;
116/114 R, 114 P, 114 PV, 114 Q, DIG. 8

[56] References Cited

U.S. PATENT DOCUMENTS

| | | | |
|---|---|---|---|
| 293,481 | 2/1884 | Magowan | 73/40.5 R |
| 1,175,373 | 3/1916 | Noack | 138/109 |
| 1,978,211 | 10/1934 | Loughead | 138/125 |
| 2,097,862 | 11/1937 | McKay | 138/126 |
| 2,419,053 | 4/1947 | Bennett | 138/148 X |
| 2,534,811 | 12/1950 | Corlett | 138/109 X |
| 2,578,140 | 12/1951 | Krupp et al. | 138/121 X |
| 3,047,026 | 7/1962 | Kahn | 138/121 X |
| 3,119,415 | 1/1964 | Gallaway et al. | 138/103 |
| 3,194,274 | 7/1965 | Griffiths et al. | 138/137 |
| 3,295,557 | 1/1967 | Christiansen | 138/109 X |
| 3,299,417 | 1/1967 | Sibthorpe | 73/49.1 X |
| 3,548,884 | 12/1970 | Ambrose | 138/137 X |
| 3,581,775 | 6/1971 | Dahl | 138/104 |
| 3,613,736 | 10/1971 | Kuwabora | 285/149 X |
| 3,717,180 | 2/1973 | Ambrose et al. | 138/153 |
| 3,773,090 | 11/1973 | Ghersa | 138/178 X |
| 3,831,635 | 8/1974 | Burton | 138/103 X |
| 3,835,890 | 9/1974 | Miceli | 138/103 |
| 3,972,223 | 8/1976 | Torghele | 138/104 X |

Primary Examiner—Richard E. Aegerter
Assistant Examiner—James E. Bryant, III
Attorney, Agent, or Firm—Stevens, Davis, Miller & Mosher

[57] ABSTRACT

A flexible hose line which may be used for loading and unloading oil tankers having a secondary fluid retaining reinforcement carcass to retain leakage and to indicate by radial expansion failure of the main carcass. The secondary carcass may be of high elongation material or may have an angle of lay of the reinforcement to give radial expansion on pressurization.

20 Claims, 8 Drawing Figures

FLEXIBLE HOSE LINES

This invention relates to flexible hose lines and in particular to hose lines used for loading and unloading oil tankers.

Oil tankers are commonly loaded and unloaded when moored offshore and the flexible hose lines used are subject to much flexing and rough handling particularly during connecting operations and severe weathering. Failure of hose due to severe kinking, shock loading, tensile pull, or other factors is a great problem to oil companies and environmentalists due to the resultant oil spillage. Furthermore a hose line failure may severely delay tanker turn-around and thus incur great expense.

Previously hose failures have been reduced by increasing the strength of the reinforcement carcass built but despite the increased life obtained failure does finally occur and high strength hose is commonly less flexible and thus more difficult to handle.

According to the present invention a flexible hose line comprises a main fluid-retaining reinforcement carcass and a secondary fluid-retaining reinforcement carcass enclosing at least part of the length of the main carcass wherein the secondary carcass is adapted to expand radially and to retain fluid leakage from the enclosed main carcass.

In a preferred arrangement the secondary carcass separately encloses adjacent successive lengths of the main carcass each length being substantially less than the total length of the hose line. In the case of a hose line comprising sections of hose fastened end-to-end a secondary carcass may enclose each section of hose or alternatively each section of hose may have provided two or more enclosed sections of main hose carcass. When the end-to-end hose lengths each comprise metal end fittings at either end of a length of hose the secondary carcass or carcasses are preferably connected to the end fitting separately to the main carcass such that leakage between either end fitting and the main carcass is retained.

Optionally the hose may be buoyant by means of attached buoyant floats attached at intervals along the hose line or preferably self-buoyant, buoyancy then being provided by a layer or layers of low density material within the structure of the hose. The degree of buoyancy provided is dependent on the use to which the hose is to be put (i.e. underwater pipe lines, buoy to sea floor pipe lines, or buoy to ship pipe lines). Furthermore the hose may be of constant or varying bore diameter such as can be used to connect hose of one diameter to the ships' outlet manifolds of a different diameter.

The secondary carcass may comprise a layer of polymeric material which may be thin and there may be incorporated one or more layers of reinforcement material which may have a substantially higher elongation than the elongation of the reinforcement of the main carcass, the material is chosen such that, at the designed working pressure of the hose, substantial elongation occurs so that radial expansion of the hose occurs. The reinforcement material is preferably in the form of a layer of woven material but may be in the form of a braided layer or a helical winding or indeed any combination of such layers. Preferably an even number of reinforcement layer is used. Alternatively or in addition the secondary reinforcement layer may be arranged to have an angle of lay with regard to the longitudinal axis of the hose substantially less than normal lay angles used in balancing holes constructions e.g. less than 50°. Furthermore the secondary carcass may be longer than the main carcass, this being achieved by means of the secondary carcass being either longitudinally compressed or more preferably being folded, i.e. convoluted. A preferred degree of convolutions provides a secondary carcass 15–20% longer than the main carcass when unfolded by radial expansion.

In a preferred arrangement high elongation material, an angle of 25°–30° and convolutions are used together such that the maximum radial expansion is obtained on failure of the main carcass. The expansion may be detected either visually or by alternative sensing means.

The secondary carcass may be applied directly over the main carcass or may be spaced-apart from the main carcass. The space is preferably filled by an intervening layer of low density closed cell sponge material (e.g. 2–6 lb/cu ft.). Furthermore part or all of the buoyancy material for the hose may be placed between the main and secondary carcasses. The convolutions in the secondary carcass may be formed by means of the intervening material being convoluted and/or by means of varying the wrapping tension when applying the secondary carcass reinforcement over the intervening material.

Baffles may be provided at spaced apart intervals along the intervening material to localize the hose length subjected to expansion upon leakage of the main carcass. These may comprise rigid baffles or rings of reinforcement material.

Suitable reinforcement materials include textiles such as nylon, polyesters, rayon and "Kevlar" (Registered Trade Mark) materials. Other suitable materials include a glass fiber or steel cord having a high twist such that the elongation of the material is suitable. Elongations of the order of $7\frac{1}{2}\%$ are preferred when used with a wire reinforced main carcass, the elongation of which is typically $3\frac{1}{2}\%$.

Further aspects of the present invention will be apparent from the following description, by way of example only, of one embodiment of the invention in conjunction with the attached drawing in which.

The hose of this invention is suitable for delivering oil at 10–15 bars.

Figure 1:
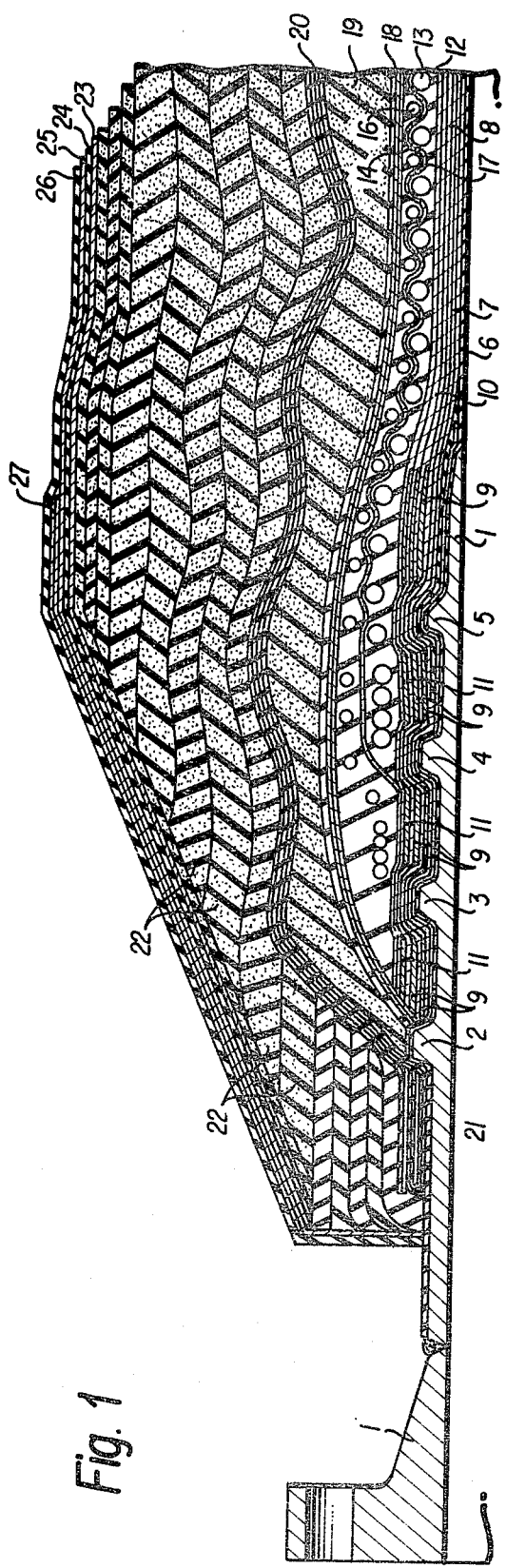
FIG. 1 shows a longitudinal section through the wall of one end of a 600 mm nominal bore self-buoyany hose section for forming a hose line attached at each end to a rigid end fitting or nipple.
Figure 2:
FIG. 2 illustrates a hose line comprising sections of hose 50 of the above type fastened end-to-end, a secondary carcass enclosing each section of hose.
Figure 3:
FIG. 3 illustrates the use of buoyancy floates 51 attached at intervals along the hose line 50.
Figure 4:
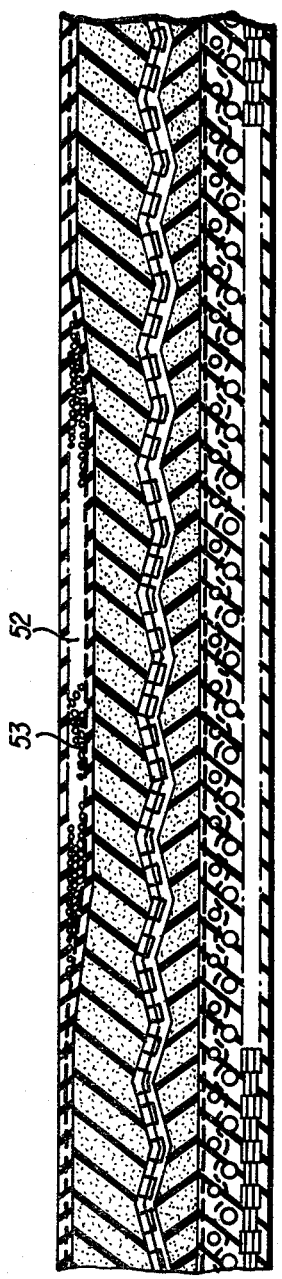
FIG. 4 is a cross-sectional view of part of the hose illustrating the positioning of a baffle 52.
Figure 5:
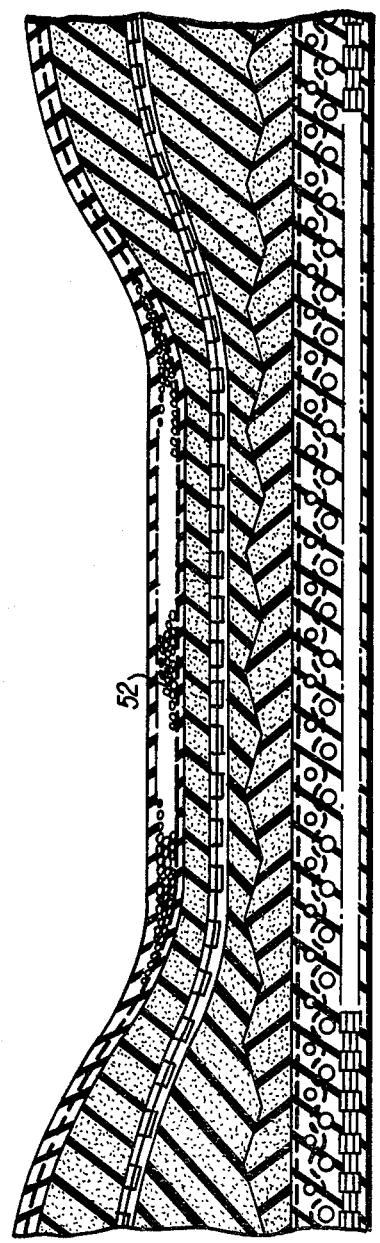
FIG. 5 illustrates the function of the baffle 52 to retain the secondary carriers from radial expansion in the area of the baffle 52 when there is leakage past the primary covers.
Figure 6:
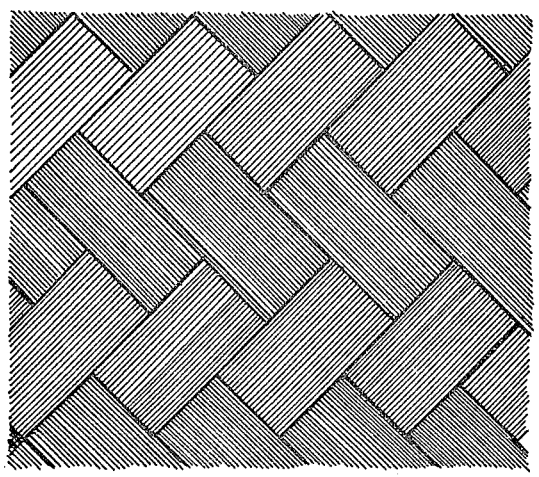
FIG. 6 shows a braided layer of reinforcement material of the secondary carcass.
Figure 7:
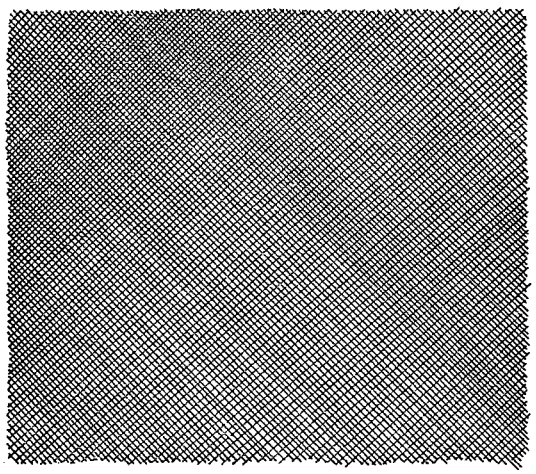
FIG. 7 shows a woven layer of reinforcement material of the secondary carcass.
Figure 8:
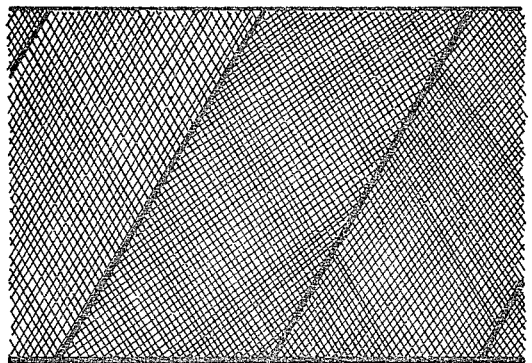
FIG. 8 shows the reinforcement helically wound with an angle of lay of between 25 and 30 degrees.

Turning now to FIG. 1, each end fitting or nipple of the hose comprises a disc-shaped end flange 1 which is butt welded to a tubular nipple 1a which has provided four spaced-apart integral circumferential rings 2,3,4 and 5 attached to its outer diameter. The nipple is mounted on the end of a steel mandrel onto which the hose is to be assembled and an inner lining layer 6 of 3.81 mm thick nitrile rubber is applied. The construction of the hose at one only of the two identical ends will be described. The inner lining layer 6 extends over the mandrel, the four rings 2,3,4 and 5 and the remainder of the nipple 1a as shown. A breaker layer 7 comprising one ply of leno weave fabric having approximately 8 weft threads per inch skim-coated with nitrile bonding rubber to give an overall thickness of 0.8-1.0 mm is then applied preparatory to forming the main reinforcement carcass.

The main reinforcement carcass comprises six plies 8 of brass-coated cabled steel wire cords having a wire tensile strength of 2460–2700 N/mm$^2$ and sufficient ends per ply to give a minimum breaking load of 1.700 Kgs per inch strip. Each ply is applied as a helically wound strip with a lay angle of 50° to the longitudinal axis and such that each cord is individually encapsulated in a nitrile rubber bonding compound. Binding wires 9 are applied over some layers to provide retention onto the nipple as shown. A breaker ply 10, similar to the previous breaker ply 7, is then applied followed by a final layer of binder wires 11 over the nipple and a filler layer 12 of 12.2 mm thick nitrile rubber in which is embedded a first main reinforcement wire 13 helically wound. The wire 13 is of 12.7 mm diameter capperized steel wire having a 900/1100 N/mm$^2$ tensile strength and a spacing between adjacent turns of 25.4 mm. Two interplies 14 of nylon cord fabric applied at a bias angle of 45° and each skimmed with bonding rubber are then followed by a second filler layer 15 of blended natural/synthetic rubber which is 3.56 mm thick and in which is embedded a second main reinforcement wire 16 which is again of copperized 900/1100 N/mm$^2$ tensile steel wire which is 6.35 mm. diameter and wound with a spacing between adjacent coils of 31.75 mm. The second main reinforcing layer coils lie between the coils of the first main reinforcing layer. Two base holding plies 17 of nylon cord fabric skim-coated with natural/synthetic rubber bonding compound to a thickness per ply of 2.03 mm are finally covered by a single base hose cover 18 of 3.175 mm thick blended natural/synthetic rubber based compound for good water resistance.

It should be noted that the above described main reinforcement carcass extends over the last three nipple rings 3,4, and 5 only and does not extend to the first nipple ring 2.

An intervening layer 19 of high density closed-cell sponge cross-linked polyethylene (density 2 lb/sq ft) is applied over the main carcass. This layer 19 has an outer surface which is formed convoluted by varying the tension in wrapping and by using a pre-formed profiled material section.

The secondary reinforcement carcass 20 is next applied and comprises a nitrile rubber lining layer of 2.03 mm thick material, four ply layers of polyester cord, the cord having a strength of 400 Kg/cm strip, and a cover P of 1.02 mm thick nitrile rubber.

The end of the secondary reinforcement carcass 20 is attached to the nipple 1a beyond the first retainer ring 2, by further windings 21 of binder wire and due to the convoluted intervening layer 19 the secondary carcass 20 is formed convoluted.

Several buoyancy layers 22, the numbers required depending on the degree of buoyancy, are then applied.

These may be of expanded polyethylene, expanded p v c, expanded natural rubber based (specific gravity vulcanized e.g. 0.17) or a similar material. The buoyancy layers are covered by a layer of blowing sponge e.g. closed cell polychloroprene (specific gravity 0.30), a further breaker layer 23 (similar to 7) a first cover 24 of 2.79 mm thick polychloroprene-based material, another breaker layer 25 made as for the interply layers, and an outer cover 26 of 2.03 mm thick polychloroprenebased material.

Additional strength is provided at the nipple attachments at each end of the hose by means of shoulder plies 27 of nylon cord fabric skim-coated with bonding rubber, which are applied at 45° bias and extend for 1200 mm in the longitudinal direction.

The resultant hose is finally cured by heating in a steam oven and is removed from the mandrel. During vulcanization the blowing sponge R blows to pressurize the assembly and form a compacted assembly.

The resultant hose in use acts substantially as a normal hose but failure of the main carcass, or the attachment of the main carcass to the nipple, which results in fluid leakage from the main carcass is contained by the secondary carcass. The secondary carcass provides a burst strength of 20–27.5 bars but due to its convolution and the use of high elongaton reinforcing material a considerable and visible increase in the hose diameter is caused when pressure is applied to it. Thus the failure of the main carcass can be seen but the hose is suitable for further use and may be replaced when convenient e.g. before the next tanker unloading operation or when sea conditions permit.

The provision of the secondary carcass assists in protecting the main carcass from damage from external forces by acting as a cushioning layer.

The visual recognition of a secondary carcass which is radially expanded by main carcass or nipple-attachment failure can be accentuated by providing on the external surface of the hose markings such as ribs, grooves or other contrasting surface markings which visually display the hose surface distortion brought about by radial expansion or tensioning of the secondary carcass. The markings can be circumferential or helical but arrangements including longitudinal markings may provide an enhanced effect particularly when the hose is viewed longitudinally when the divergent/convergent effect of the expanded surface markings would be detectable; longitudinal markings could be used in conjunction with circumferential markings giving an overall chequered appearance which, in the case of a floating oil hose, to stand out as a hazard to shipping.

Having now described my invention, what I claim is:

1. A flexible hose line comprising a main fluid retaining reinforcement carcass, a secondary radially expansible fluid retaining carcass having reinforcement material and enclosing the outside of the main carcass along at least part of the length thereof and, a means for effecting a fluid tight seal between the ends of the secondary carcass and said main carcass wherein upon fluid leakage from the enclosed main carcass the secondary carcass expands radially while preventing escape of the fluid.

2. A flexible hose line according to claim 1 wherein the secondary carcass separately encloses adjacent successive portions of the length of the hose line and each enclosed length is substantially shorter than the total length of the hose line.

3. A flexible hose line according to claim 2 wherein the hose line comprises sections of hose fastened end-to-end and a secondary carcass encloses each section of hose.

4. A flexible hose line according to claim 3 wherein the hose sections each comprise a length of hose and rigid end fittings for connection to the end fittings of the adjacent hose section.

5. A flexible hose line according to claim 4 wherein a single secondary carcass is provided on each length of hose and the secondary carcass is sealably attached between the respective end fittings so that any fluid leaking from the connection between an end fitting and the flexible hose is retained.

6. A flexible hose line according to claim 5 which is made buoyant by means of buoyancy floats attached at intervals along the hose line.

7. A flexible hose line according to claim 5 including layers of low density material within the structure of the hose to make the hose line buoyant.

8. A hose line according to claim 5 wherein the secondary carcass comprises a layer of polymeric material and at least one layer of reinforcement material having a substantially higher elongation than the reinforcement material of the main carcass so that on application of the hose working pressure to the secondary carcass said radial expansion of the secondary carcass occurs.

9. A hose line according to claim 8 wherein the reinforcement material layer of the secondary carcass is woven.

10. A hose line according to claim 8 wherein the reinforcement material layer of the secondary carcass is braided.

11. A hose line according to claim 8 wherein the reinforcement material of the secondary carcass is helically wound.

12. A hose line according to claim 8 wherein an even numbe of layers of reinforcement material are provided in the secondary carcass.

13. A hose line according to claim 11 wherein the angle of lay between an axis extending longitudinally of the hose and the reinforcement material is less than 50°.

14. A hose line according to claim 13 wherein the angle of lay is between 25 and 30°.

15. A hose line according to claim 8 wherein the secondary carcass is longer than the length of main carcass enclosed.

16. A hose line according to claim 15 wherein the secondary carcass is between 15 and 20% longer than the length of main carcass enclosed.

17. A hose line according to claim 15 wherein the secondary carcass is convoluted.

18. A hose line according to claim 1 wherein the secondary carcass is applied directly over the main carcass.

19. A hose line according to claim 1 wherein the secondary carcass is radially spaced-apart from the main carcass and the space is filled by an intervening layer of low density closed cell sponge material which provides some self buoyancy for the hose line.

20. A hose line according to claim 19 wherein baffles are provided at spaced-apart intervals along the intervening material to localize the hose length subjected to expansion upon leakage of the main carcass.

* * * * *